United States Patent
Silvestrini et al.

(10) Patent No.: US 8,662,274 B2
(45) Date of Patent: Mar. 4, 2014

(54) ROTATIONAL COUPLING DEVICE WITH IMPROVED ACTUATOR ASSEMBLY

(75) Inventors: Richard L. Silvestrini, Rockton, IL (US); Richard Wayne Mayberry, Trophy Club, TX (US)

(73) Assignee: Warner Electric Technology LLC, Braintree, MA (US)

( * ) Notice: Subject to any disclaimer, the term of this patent is extended or adjusted under 35 U.S.C. 154(b) by 178 days.

(21) Appl. No.: 13/418,675

(22) Filed: Mar. 13, 2012

(65) Prior Publication Data
US 2013/0240316 A1    Sep. 19, 2013

(51) Int. Cl.
*F16D 33/00* (2006.01)

(52) U.S. Cl.
USPC .......................................... 192/66.3

(58) Field of Classification Search
USPC ................... 192/35, 66.3, 32, 31, 30 R, 66.1
See application file for complete search history.

(56) References Cited

U.S. PATENT DOCUMENTS

| | | | |
|---|---|---|---|
| 5,280,829 A | 1/1994 | Forsythe | |
| 5,943,911 A | 8/1999 | Beckerman | |
| 6,029,782 A | 2/2000 | Chojecki et al. | |
| 6,098,775 A | 8/2000 | Chojecki | |
| 6,378,677 B1 | 4/2002 | Kuroka et al. | |
| 7,374,027 B2 | 5/2008 | Mayberry et al. | |
| 7,556,128 B2 | 7/2009 | Mayberry et al. | |
| 7,591,349 B2 | 9/2009 | McConkie et al. | |
| 7,721,864 B2 | 5/2010 | Bluhm | |
| 2004/0188212 A1 | 9/2004 | Weilant | |
| 2006/0081438 A1 | 4/2006 | Weilant | |
| 2008/0185239 A1 | 8/2008 | Hakon et al. | |
| 2009/0000895 A1* | 1/2009 | Inomori et al. | 192/31 |
| 2010/0222175 A1* | 9/2010 | Gassmann et al. | 475/220 |
| 2010/0236888 A1* | 9/2010 | Pritchard et al. | 192/35 |
| 2012/0024651 A1* | 2/2012 | Miyazaki | 192/66.32 |
| 2012/0073930 A1* | 3/2012 | Lansberry et al. | 192/66.3 |
| 2012/0292153 A1* | 11/2012 | Noguchi et al. | 192/66.3 |
| 2013/0195626 A1* | 8/2013 | White et al. | 415/123 |

OTHER PUBLICATIONS

Declaration of Richard Silvestrini.
Warner Electric, Inc. "Warner Installation and Operation Manual—MDO or ECM Clutch," (Feb. 1995).
International Search Report issued in corresponding International (PCT) Patent Application No. PCT/US2013/030098 (May 29, 2013).
Written Opinion issued in corresponding International (PCT) Patent Application No. PCT/US2013/030098 (May 29, 2013).

* cited by examiner

*Primary Examiner* — David D Le
*Assistant Examiner* — David J Hlavka
(74) *Attorney, Agent, or Firm* — Dykema Gossett PLLC

(57) ABSTRACT

A rotational coupling device is provided having an improved actuator for compressing friction discs coupled to an input ring and an output hub disposed about a rotational axis. The actuator includes a pole structure and a field shell housing a conductor, each with aligned, axially extending, radially spaced inner and outer poles. An armature is coupled for rotation with the input ring, but axially movable relative thereto and axially aligned with an end wall of the pole structure extending between the inner and outer actuator poles. First and second axially spaced actuator discs are disposed radially between the pole structure and the output hub with the first actuator disc rotatably coupled to the pole structure. The discs define cam surfaces along which a plurality of balls move to expand and contract the actuator discs upon relative rotation of the actuator discs.

11 Claims, 2 Drawing Sheets

ROTATIONAL COUPLING DEVICE WITH IMPROVED ACTUATOR ASSEMBLY

BACKGROUND OF THE INVENTION

1. Field of the Invention

This invention relates to rotational coupling devices such as brakes and clutches and, in particular, to a rotational coupling device having an improved actuator assembly to engage the device.

2. Discussion of Related Art

Rotational coupling devices such as clutches and brakes are used to control transfer of torque between rotational bodies. When used in many industrial applications, such devices may range in diameter from several inches to several feet with torque capacities exceeding eight million pound-inches. Conventional rotational coupling devices used in industrial applications typically employ fluid (pneumatic or hydraulic) or mechanical (e.g., spring) actuators to engage and release the device to allow or prevent torque transfer. Fluid actuators in particular require a network of fluid conduits connecting to a fluid reservoir and appropriate sealing of the device. Meeting these requirements may create undesirable costs and failure and maintenance issues. Further, fluid actuators often work poorly in environments with extreme temperature conditions. Electromagnetic actuators are often used in smaller coupling devices such as those used in vehicles or consumer appliances. Such actuators have not generally found use with larger clutches used in industrial applications, however, in part because of size and packaging difficulties in scaling the actuators for use with larger clutches.

The inventors herein have recognized a need for a rotational coupling device that will minimize and/or eliminate one or more of the above-identified deficiencies.

SUMMARY OF THE INVENTION

The present invention provides a rotational coupling device.

A rotational coupling device in accordance with one embodiment of the present invention includes an output hub disposed about an axis of rotation. An input ring is disposed about the output hub and the axis. The device further includes a first friction disc coupled to the output hub for rotation therewith and axially movable relative thereto and a second friction disc coupled to the input hub for rotation therewith and axially movable relative thereto. The device further includes an actuator assembly. The actuator assembly includes a field shell fixed against rotation. The field shell defines axially extending, radially spaced inner and outer field shell poles configured to receive a conductor therebetween. The actuator assembly further includes a pole structure defining axially extending, radially spaced inner and outer actuator poles and an end wall extending radially therebetween. The inner and outer actuator poles are radially aligned with corresponding ones of the inner and outer field shell poles. The actuator assembly further includes an armature coupled to the input ring for rotation therewith and axially movable relative to the input ring. The actuator is axially aligned with the end wall of the pole structure. The actuator assembly further includes a first actuator disc disposed about the output hub and coupled to the pole structure. The first actuator disc is disposed radially between the pole structure and the output hub. A second actuator disc is disposed about the output hub and axially spaced from the first actuator disc. The second actuator disc is disposed radially between the pole structure and the output hub. At least one of the first and second actuator discs defines a plurality of cam surfaces. A plurality of balls are disposed between the first and second actuator discs. Each ball of the plurality of balls is in engagement with a corresponding cam surface of the plurality of cam surfaces. Energization of the conductor causes engagement of the armature with the pole structure and transfer of torque to the pole structure and the first actuator disc resulting in movement of the plurality of balls along the plurality of cam surfaces and axial movement of the second actuator disc towards the first and second friction discs.

A rotational coupling device in accordance with the present invention represents an improvement over conventional devices. The electromagnetic actuator provides certain cost savings relative to a pneumatic actuator. The electromagnetic actuator also eliminates a number of potential failure and maintenance issues and functions better than pneumatic actuators in extreme temperature environments. Further, the actuator design features improved packaging relative to conventional electromagnetic actuators. In particular, the actuator is relatively compact along the axis of rotation as compared to conventional designs.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
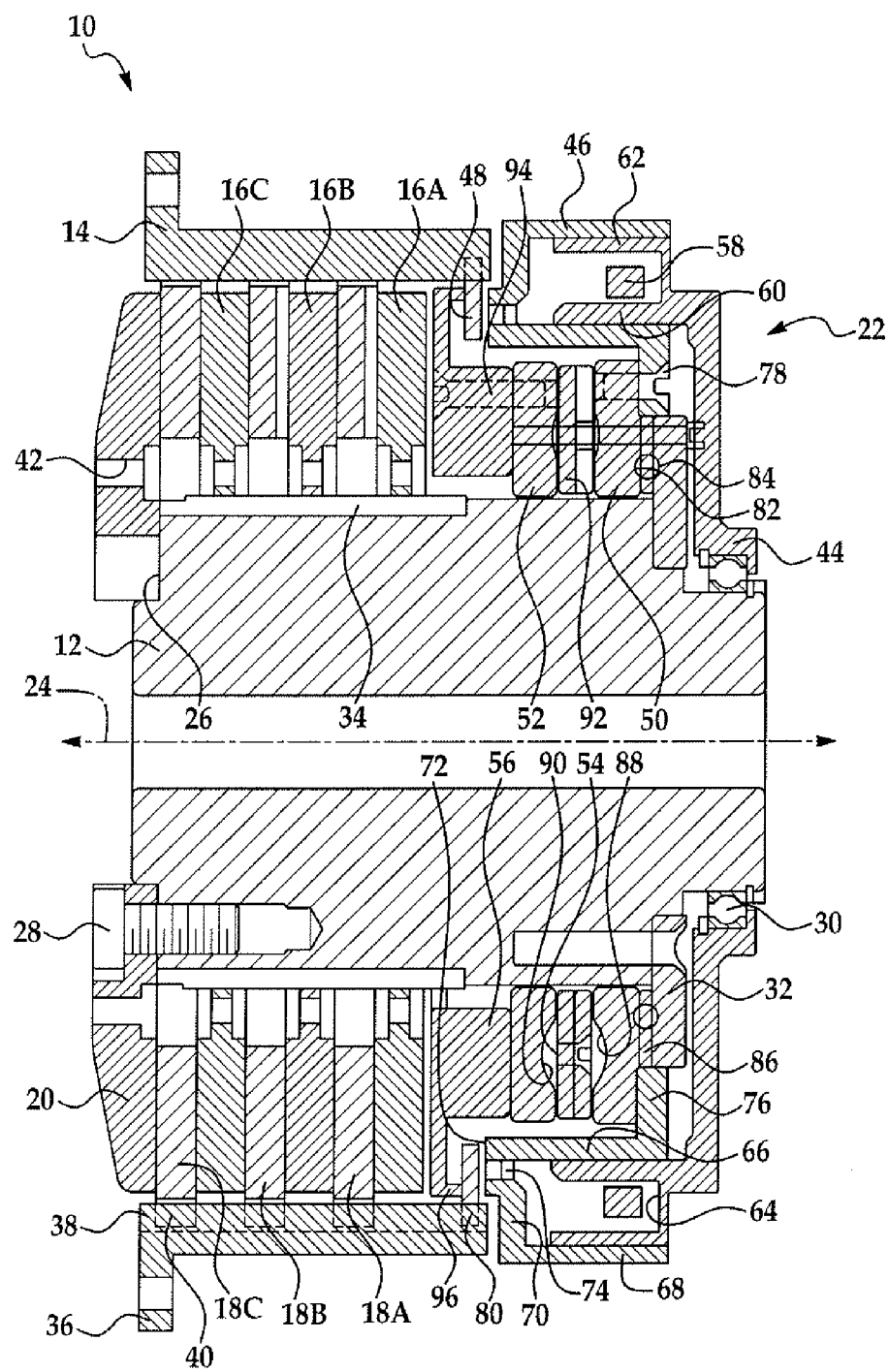
FIG. 1 is a cross-sectional view of a rotational coupling device in accordance with one embodiment of the present invention.

Referring now to the drawings wherein like reference numerals are used to identify identical components in the various views, FIG. 1 illustrates a rotational coupling device 10 in accordance with one embodiment of the present invention. Device 10 functions as a clutch to selectively transfer torque to a shaft (not shown) from an external device. Device 10 also functions as a brake when torque is not being transferred. Device 10 is provided for use in industrial and off-highway vehicle applications such as industrial snow blowing equipment used in clearing airport runways and roads, road paving machines and wood chippers. It will be understood by those of ordinary skill in the art, however, that device 10 may be used in a wide variety of applications requiring a clutch and/or brake to transmit torque between an engine and a load. Device 10 may include an output hub 12, an input ring 14, friction discs 16A, 16B, 16C and 18A, 18B, 18C, an end plate 20, and an actuator assembly 22 in accordance with the present invention.

Output hub 12 is configured to receive a shaft (not shown) and to transfer torque to the shaft from an external device. Hub 12 may be made from various metals and metal alloys and is disposed about an axis 24 of rotation. Hub 12 is annular and has a substantially constant inner diameter configured to receive the shaft. Hub 12 has an outer diameter that varies along the axial length of hub 12. At one axial end, the outer diameter of hub 12 defines a shoulder 26 configured to receive end plate 20. End plate 20 may be fastened to hub 12 by a plurality of axially extending fasteners 28 such as bolts, pins or screws. At an opposite axial end, the outer diameter of hub 12 is sized to receive bearing 30 and ring 32. Ring 32 may also be fastened to hub 12 by a plurality of axially extending fasteners (not shown) such as bolts, pins or screws. Intermediate the axial ends of hub 12, hub 12 defines a plurality of axially extending spline teeth 34 projecting radially outward for a purpose described hereinbelow.

Input ring 14 is configured for connection to an external torque generating device (not shown). Input ring 14 may be made from various metals and metal alloys and is disposed about output hub 12 and axis 24. Input ring 14 is annular in shape and may define a radially extending flange 36 at one axial end for connection to the external torque generating device. Ring 14 defines a plurality of axially extending, radially inwardly projecting spline teeth 38 for a purpose described hereinbelow.

Friction discs 16A-C are provided to transmit a braking torque to output hub 12 upon engagement of discs 16A-C with friction discs 18A-C. Discs 16A-C are conventional in the art any may be made from conventional metals and metal alloys and may include a layer of a conventional friction material on either side. Friction discs 16A-C are annular in shape and disposed about axis 24. Friction discs 16A-C may include a plurality of spline teeth (not shown) disposed on radially inner surfaces of discs 16A-C that are configured to mate with teeth 34 on hub 12 thereby preventing relative rotation of discs 16A-C relative to hub 12, but allowing axial movement of discs 16A-C relative to hub 12. Friction discs 16A-C may be biased apart by springs (not shown) that are disposed between each pair of discs 16A-C and are disposed about pins (not shown) extending through discs 16A-C. Although three friction discs 16A-C are shown in the illustrated embodiment, it should be understood that the number of friction discs can be varied to vary braking torque.

Friction discs 18A-C are provided to transmit a braking torque from input ring 14 to friction discs 16A-C upon engagement of discs 16A-C with friction discs 18A-C. Discs 18A-C are conventional in the art any may be made from conventional metals and metal alloys and may include a layer of a conventional friction material on either side. Friction discs 18A-C are annular in shape and disposed about axis 24. Friction discs 18A-C may include a plurality of spline teeth 40 disposed on radially outer surfaces of discs 18A-C that are configured to mate with teeth 38 on input ring 14 thereby preventing relative rotation of discs 18A-C relative to ring 14, but allowing axial movement of discs 18A-C relative to ring 14. Friction discs 18A-C may be biased apart by springs (not shown) that are disposed between each pair of discs 18A-C and are disposed about pins (not shown) extending through discs 18A-C. Although three friction discs 18A-C are shown in the illustrated embodiment, it should be understood that the number of friction discs can be varied to vary braking torque.

End plate 20 defines a portion of a housing enclosing the components of device 10 and also provides a reaction force upon compression of discs 16A-C, 18A-C by actuator assembly 22. End plate 20 is configured to be received on shoulder 26 defined in output hub 12 and may be fastened to hub 12 using fasteners 28. End plate 20 is annular in shaped and disposed about axis 24. End plate 20 may be made from conventional metals and metal alloys and may include a layer of a conventional friction material disposed on a side of plate 20 facing discs 16A-C, 18A-C. Plate 20 may define apertures 42 extending through plate 20 and configured to receive pins (not shown) on which the springs (not shown) used to bias discs 16A-C, 18A-C apart are mounted.

Actuator assembly 22 is provided to cause selective engagement of discs 16A-C, 18A-C and corresponding transfer of torque from input ring 14 to output hub 12. Assembly 22 may include a field shell 44, pole structure 46, armature 48, actuator discs 50, 52, balls 54 and pressure plate 56.

Field shell 44 is provided to house a conductor 58 and to form part of magnetic circuit causing movement of armature 48. Field shell 44 may be made from conventional materials such as metals and metal alloys having a relatively low magnetic reluctance and high magnetic permeability. Field Shell 44 is annular in shape and disposed about axis 24. Field shell 44 is supported on output hub 12 by bearing 30 which permits rotation of hub 12 relative to field shell 44 which may be fixed against rotation. Field shell 44 defines axially extending, radially inner and outer poles 60, 62. Pole 60 may be axially aligned with armature 48 and a radially outer portion of friction discs 16A-C, 18A-C while pole 62 may be axially aligned with input ring 14. Poles 60, 62 define a chamber 64 therebetween configured to receive conductor 58. Conductor 58 may comprise a conventional copper coil although other known conductors may alternatively be used. Conductor 58 may be connected electrically to a power supply (not shown) such as a battery.

Pole structure 46 provides a part of the magnetic circuit causing movement of armature 48 and provides a means for transfer of torque from armature 48 to actuator disc 50. Pole structure 46 may be made from conventional materials such as metals and metal alloys having a relatively low magnetic reluctance and high magnetic permeability. Pole structure 46 defines axially extending, radially inner and outer poles 66, 68 connected by a radially extending end wall 70. Inner pole 66 is disposed radially inwardly of inner field shell pole 60 while outer pole 68 is disposed radially outwardly of outer field shell pole 62 such that field shell 44 is telescoped within pole structure 46. Inner pole 66 is axially aligned with armature 48 while outer pole 68 is axially aligned with a radially outer edge of input ring 14 and is not aligned with armature 48. End wall 70 defines an engagement surface 72 opposing armature 48 and axially aligned with inner field shell pole 60. End wall 70 may include one or more apertures 74 extending axially therethrough and aligned with armature 48 to define a flux flow path between end wall 70 and armature 48. Pole structure 46 includes a flange 76 extending radially inwardly from one axial end of inner pole 66 opposite the end of pole 66 from which end wall 70 extends. The radially innermost portion of flange 76 is axially aligned with actuator disc 50 and may be coupled to disc 50 using fasteners 78 such as bolts, pins or screws.

Armature 48 is provided to transfer torque from input ring 14 to pole structure 46. Armature 48 may be made from conventional materials such as metals and metal alloys having a relatively low magnetic reluctance and high magnetic permeability. Armature 48 is annular in shape and is disposed about axis 24. Armature 48 includes a plurality of spline teeth 80 disposed on a radially outer surface of armature 48 that are configured to mate with teeth 38 on input ring 14 thereby preventing relative rotation of armature 48 relative to ring 14, but allowing axial movement of armature 48 relative to ring 14. Upon energization of conductor 58 a magnetic circuit is created that draws armature 48 into engagement with engagement surface 72 on end wall 70 of pole structure 46 and causes rotation of pole structure 46 and actuator disc 50.

Actuator discs 50, 52 and balls 54 are provided to generate an axial force in response to rotation of pole structure 46 in order compress friction discs 16A-C, 18A-C and cause engagement of discs 16A-C, 18A-C and thereby impart rotational torque to discs 16A-C and output hub 12. Actuator discs 50, 52 may be made from metals and metal alloys and, in particular, the steel alloy identified as 8620 under the standards promulgated by the American Iron and Steel Institute (AISI) or as J404 under the standards promulgated by the Society of Automotive Engineers. Discs 50, 52 may be hardened by heat treatment and/or carburizing. Balls 54 may be made from carbon steel and, in particular, may comprise hardened, grade 25 (i.e., having a sphericity (the difference between the largest diameter and smallest diameter of the ball) accurate to within 25 millionths of an inch (0.000025 inches)) carbon steel balls available from Salem Specialty Ball Co. of West Simsbury, Conn. In general, balls 54 may be made from hardened alloy or carbon steels capable of operation up to a 609,000 psi contact stress.

Figure 2:
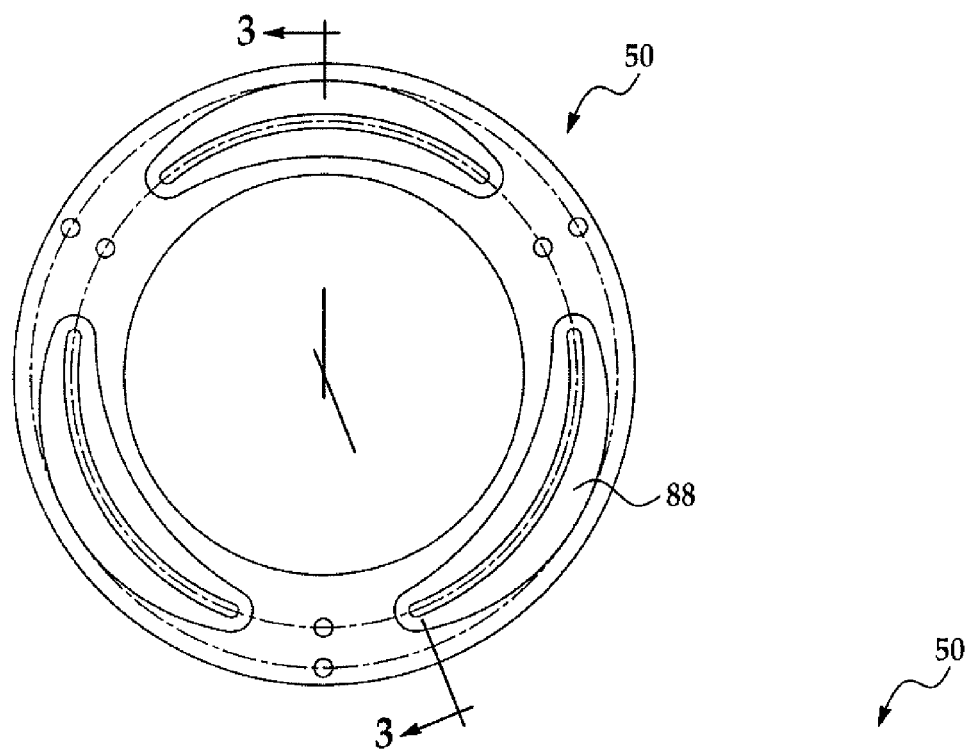
FIG. 2 is a plan view of one component of the rotational coupling device of FIG. 1.
Figure 3:
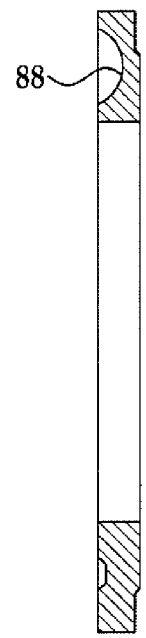
FIG. 3 is a cross-sectional view of the component of FIG. 2 taken along lines 3-3.

Discs 50, 52 are disposed about output hub 12 and axis 24 and are disposed radially between pole structure 46 and hub 12. In particular, discs 50, 52 are disposed radially between each of poles 66, 68 of pole structure 46 and hub 12. Disc 50 is also disposed radially between each of field shell poles 60, 62 and hub 12. Discs 50, 52 are axially spaced from one another by balls 54. Disc 50 is coupled to flange 76 of pole structure 46 by fasteners 78 for rotation with pole structure 46 upon energization of conductor 58 and engagement of armature 48 and pole structure 46. Disc 50 defines a race 82 on one axial side configured to receive thrust bearings 84. Bearings 84 are held within a cage 86 between disc 50 and ring 32. Bearings 84 permit a limited amount of relative rotation between disc 50 and ring 32 (and therefore hub 12) upon energization of conductor 58 and rotation of pole structure 46. Referring to FIGS. 2-3, disc 50 defines a plurality of cam surfaces 88 on an opposite axial side that are configured to receive balls 54. In the illustrated embodiment, disc 50 defines three cam surfaces 88. It should be understood, however, that the number of cam surfaces 88 may vary. The axial depth of each individual cam surfaces 88 varies along its circumferential extent. Referring again to FIG. 1, disc 52 may also define a plurality of cam surfaces 90 having the same configuration and opposing cam surfaces 88. Rotation of disc 50 causes balls 54 to move along cam surfaces 88, 90 thereby urging disc 52 away from disc 50 and towards friction discs 16A-C, 18A-C.

Balls 54 are held between discs 50, 52 between cam surfaces 88, 90. Balls 54 are held within a cage 92 disposed between discs 50, 52. In the illustrated embodiment, three balls 54 are employed and may be equally spaced circumferentially. It should be understood, however, that the number of balls 54 may vary.

Pressure plate 56 is provided to compress discs 16A-C, 18A-C, in response to movement of disc 52. Plate 56 is disposed about hub 12 and axis 24. Plate 56 is disposed axially between disc 52 and discs 16A-C, 18A-C and may be coupled to disc 52 using one or more fasteners 94 such as bolts, pins or screws. It should be understood, however, that disc 52 and pressure plate 56 could be integrated into a unitary body such that fasteners 94 are not required. One axial end of plate 56 nearer to disc 52 defines an axial end face having about the same size as disc 52. The opposite end axial end of plate 56 nearer to discs 16A-C, 18A-C defines an axial end face having about the same size as discs 16A-C. A flange 96 projects axially from the radially outermost portion of plate 56 and provides a stop to limit movement of armature 48 in one axial direction away from end wall 70 of pole structure 46.

When conductor 58 is not energized, armature 48 remains disengaged from pole structure 46. As a result, torque from input ring 14 and armature 48 is not transferred to pole structure 46 and actuator disc 50 and the separation between actuator discs 50, 52 remains relatively small thereby preventing axial movement of pressure plate 56 and compression of discs 16A-C, 18A-C which remain disengaged from one another by virtue of springs (not shown). In this state, the clutch is disengaged and torque is not transferred from input ring 14 to output hub 12. When conductor 58 is energized, armature 48 is drawn into engagement with pole structure 46 causing pole structure 46 to rotate. This rotation is imparted to actuator disc 50 and causes balls 54 to ride along cam surfaces 88, 90 thereby urging discs 50, 52 apart urging disc 52 and pressure plate 56 towards friction discs 16A-C, 18-C. Friction discs 16A-C, 18A-C are forced into engagement thereby engaging the clutch and causing transferring torque from input ring 14 to output hub 12.

A rotational coupling device in accordance with the present invention represents an improvement over conventional devices. The electromagnetic actuator provides certain cost savings relative to a pneumatic actuator. The electromagnetic actuator also eliminates a number of potential failure and maintenance issues and functions better than pneumatic actuators in extreme temperature environments. Further, the actuator design features improved packaging relative to conventional electromagnetic actuators. In particular, the location of actuator discs 50, 52 radially between the output hub 12 and the both the field shell 46 and pole structure 48 renders the actuator relatively compact along the axis of rotation as compared to conventional designs.

While the invention has been shown and described with reference to one or more particular embodiments thereof, it will be understood by those of skill in the art that various changes and modifications can be made without departing from the spirit and scope of the invention.

We claim:
1. A rotational coupling device, comprising:
an output hub disposed about an axis of rotation;
an input ring disposed about said output hub and said axis;
a first friction disc coupled to said output hub for rotation therewith and axially movable relative thereto;
a second friction disc coupled to said input hub for rotation therewith and axially movable relative thereto;
an actuator assembly, comprising:
a field shell fixed against rotation, said field shell defining axially extending, radially spaced inner and outer field shell poles configured to receive a conductor therebetween;
a pole structure defining axially extending, radially spaced inner and outer actuator poles and an end wall extending radially therebetween, said inner and outer actuator poles radially aligned with corresponding ones of said inner and outer field shell poles;
an armature coupled to said input ring for rotation therewith and axially movable relative to said input ring, said armature axially aligned with said end wall of said pole structure;
a first actuator disc disposed about said output hub and coupled to said pole structure, said first actuator disc disposed radially between said pole structure and said output hub;
a second actuator disc disposed about said output hub and axially spaced from said first actuator disc, said second actuator disc disposed radially between said pole structure and said output hub, at least one of said first and second actuator discs defining a plurality of cam surfaces; and,
a plurality of balls disposed between said first and second actuator discs, each ball of said plurality of balls in engagement with a corresponding cam surface of said plurality of cam surfaces;

wherein energization of said conductor causes engagement of said armature with said pole structure and transfer of torque to said pole structure and said first actuator disc resulting in movement of said plurality of balls along said plurality of cam surfaces and axial movement of said second actuator disc towards said first and second friction discs.

2. The rotational coupling device of claim 1, further comprising a pressure plate disposed about said output hub and coupled to said second actuator disc.

3. The rotational coupling device of claim 2 wherein at least a portion of said pressure plate is disposed axially between said armature and said first friction disc.

4. The rotational coupling device of claim 1 wherein said armature disc includes a plurality of radially outwardly extending teeth configured to mesh with a corresponding plurality of radially inwardly extending teeth on said input ring.

5. The rotational coupling device of claim 1 wherein said outer actuator pole is disposed radially outwardly of said outer field shell pole and said inner actuator pole is disposed radially inwardly of said inner field shell pole.

6. The rotational coupling device of claim 1 wherein said first actuator disc is disposed radially between said inner field shell pole and said output hub.

7. The rotational coupling device of claim 6 wherein said first actuator disc is disposed radially between said outer field shell pole and said output hub.

8. The rotational coupling device of claim 1 wherein said first actuator disc is disposed radially between said inner actuator pole and said output hub.

9. The rotational coupling device of claim 8 wherein said first actuator disc is disposed radially between said outer actuator pole and said output hub.

10. The rotational coupling device of claim 1 wherein said second actuator disc is disposed radially between said inner actuator pole and said output hub.

11. The rotational coupling device of claim 10 wherein said second actuator disc is disposed radially between said outer actuator pole and said output hub.

\* \* \* \* \*